United States Patent
Chun et al.

(10) Patent No.: US 7,872,967 B2
(45) Date of Patent: Jan. 18, 2011

(54) APPARATUS AND METHOD FOR MULTI-PROTOCOL LABEL SWITCHING LABEL-SWITCHED PATH PROTECTION SWITCHING

(75) Inventors: Kyung Gyu Chun, Daejeon (KR); Soon Seok Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 108 days.

(21) Appl. No.: 12/093,278

(22) PCT Filed: Nov. 13, 2006

(86) PCT No.: PCT/KR2006/004747

§ 371 (c)(1),
(2), (4) Date: May 9, 2008

(87) PCT Pub. No.: WO2007/066910

PCT Pub. Date: Jun. 14, 2007

(65) Prior Publication Data

US 2008/0316920 A1    Dec. 25, 2008

(30) Foreign Application Priority Data

Dec. 9, 2005    (KR) .................. 10-2005-0120298

(51) Int. Cl.
H04L 12/26    (2006.01)
H04L 1/00    (2006.01)
(52) U.S. Cl. ...................... 370/228; 370/241
(58) Field of Classification Search ............ None
See application file for complete search history.

(56) References Cited

U.S. PATENT DOCUMENTS

| 7,213,178 | B1 * | 5/2007 | Prasad et ................ 714/43 |
| 2002/0075873 | A1 * | 6/2002 | Lindhorst-Ko et al. ...... 370/394 |
| 2002/0172150 | A1 | 11/2002 | Kano |

(Continued)

FOREIGN PATENT DOCUMENTS

JP    2003-78554    3/2003

(Continued)

OTHER PUBLICATIONS

International Telecommunication Union, ITU-T Y.1711, Feb. 2004.*

(Continued)

*Primary Examiner*—Ricky Ngo
*Assistant Examiner*—Clemence Han
(74) *Attorney, Agent, or Firm*—EuriHoon Lee, Esq.

(57) ABSTRACT

Provided are system and method for multi-protocol label switching (MPLS) label-switched path (LSP) protection switching in an MPLS system employing a working LSP and a protection LSP in a 1:1 mode, The system includes: an ingress node multicasting input MPLS traffic through the working LSP and the protection LSP using a fed-back BDI signal; a transit node relaying the MPLS traffic input from the ingress node, and generating a FDI signal when the failure occurs; and an egress node extracting the MPLS traffic from the MPLS LSP input from the transit node, and when the FDI signal is detected, inserting and feeding back the BDI signal to the ingress node through a return path and performing switching to the protection LSP.

9 Claims, 7 Drawing Sheets

U.S. PATENT DOCUMENTS

| | | | |
|---|---|---|---|
| 2004/0218595 A1 | 11/2004 | Acharya et al. | |
| 2005/0063309 A1 | 3/2005 | Alicherry et al. | |
| 2005/0141417 A1* | 6/2005 | Huang et al. | 370/229 |
| 2005/0152269 A1 | 7/2005 | Liu | |
| 2006/0203717 A1* | 9/2006 | Puppa et al. | 370/216 |
| 2007/0076720 A1* | 4/2007 | Wu | 370/392 |
| 2007/0081465 A1* | 4/2007 | Puppa et al. | 370/241.1 |
| 2007/0133398 A1* | 6/2007 | Zhai | 370/228 |
| 2007/0242605 A1* | 10/2007 | Lei | 370/228 |
| 2007/0271484 A1* | 11/2007 | Johansson et al. | 714/39 |

FOREIGN PATENT DOCUMENTS

| | | |
|---|---|---|
| JP | 2003-134148 | 5/2003 |
| JP | 2003-143145 | 5/2003 |
| JP | 2003-229888 | 8/2003 |
| KR | 1020020039557 | 5/2002 |
| KR | 1020020061939 | 7/2002 |
| KR | 1020050000635 | 1/2005 |
| WO | 04/075494 A1 | 9/2004 |

OTHER PUBLICATIONS

International Telecommunication Union, ITU-T Y.1720, Sep. 2003.*

Aggarwal, Rahul et al., "OAM Mechanisms in MPLS Layer 2 Transport Networks," *IEEE Communications Magazine*, vol. 42(10):124-130 (2004).

Dana, A. et al., "LSP Restoration in MPLS Network Using Case-Based Reasoning Approach," *Proceedings of the ICCT 2003 International Conference on Communication Technology*, vol. 1(9-11):462-468 (2003).

Japanese Office Action for Application No. 2008-544238, dated Aug. 20, 2010.

* cited by examiner

[Fig. 1]
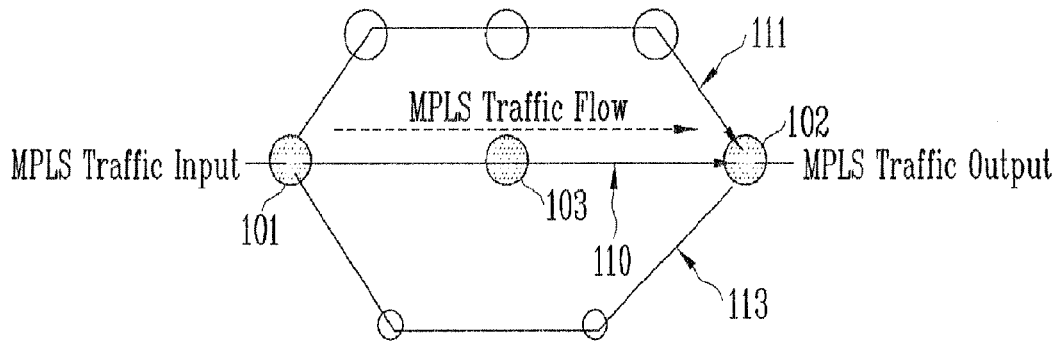
[Fig. 2]
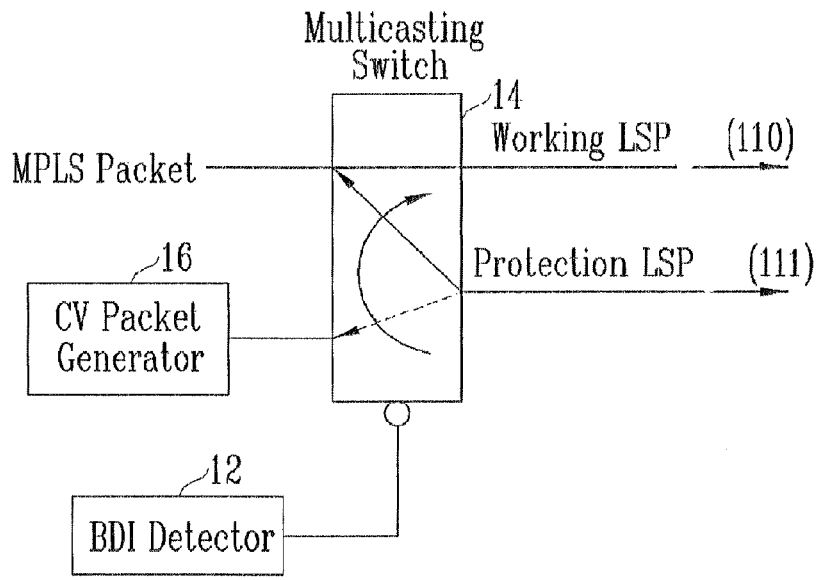
[Fig. 3]
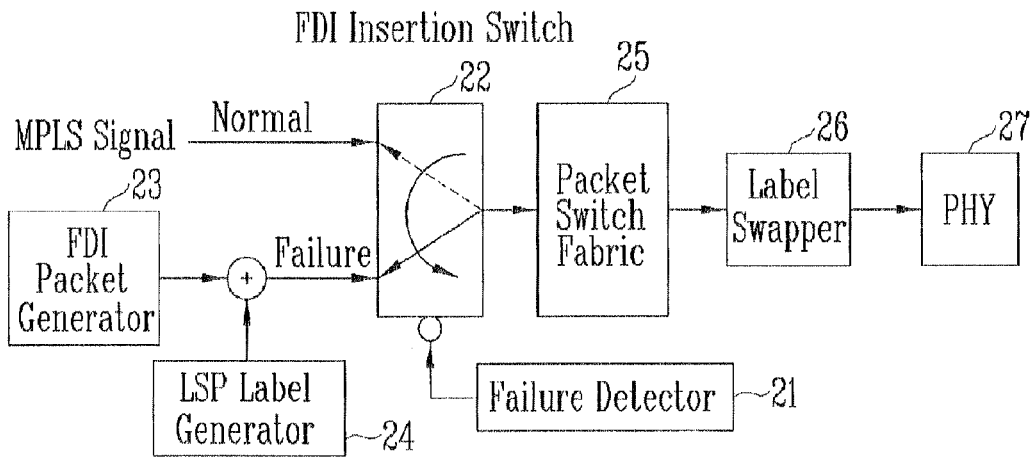

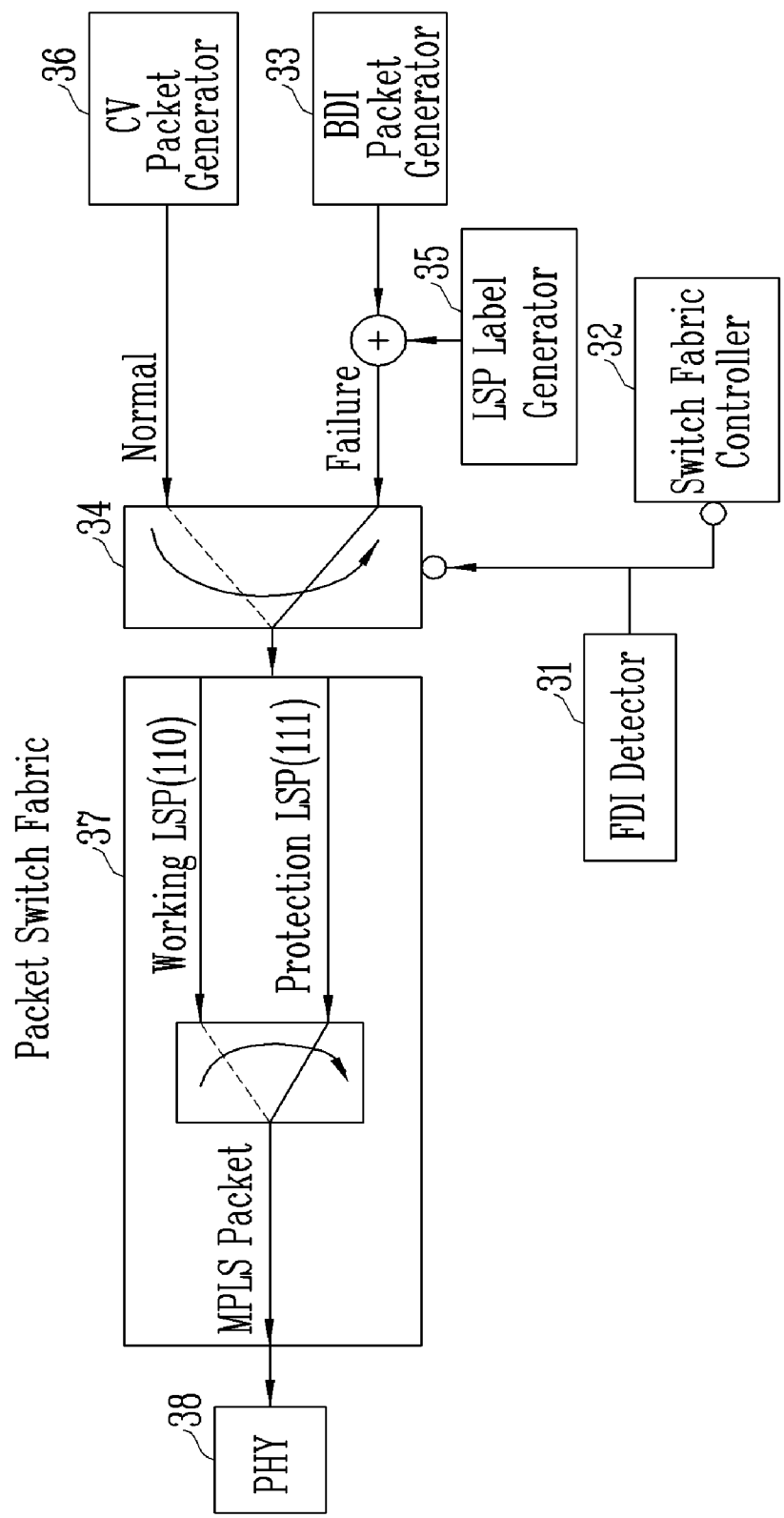
[Fig. 4]

[Fig. 5]
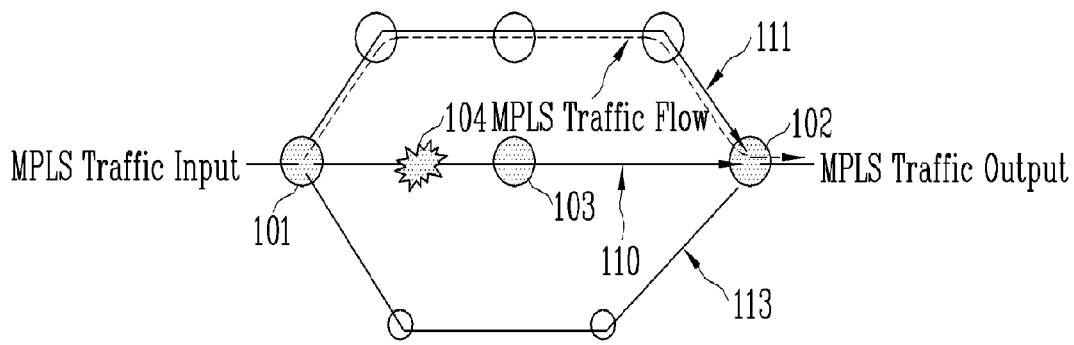
[Fig. 6]
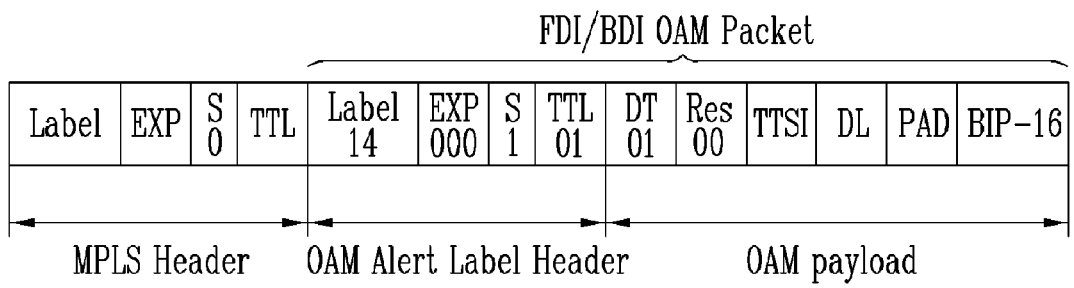
DT(Defect Type)
02 FDI
03 BDI
DL(Defect Location)

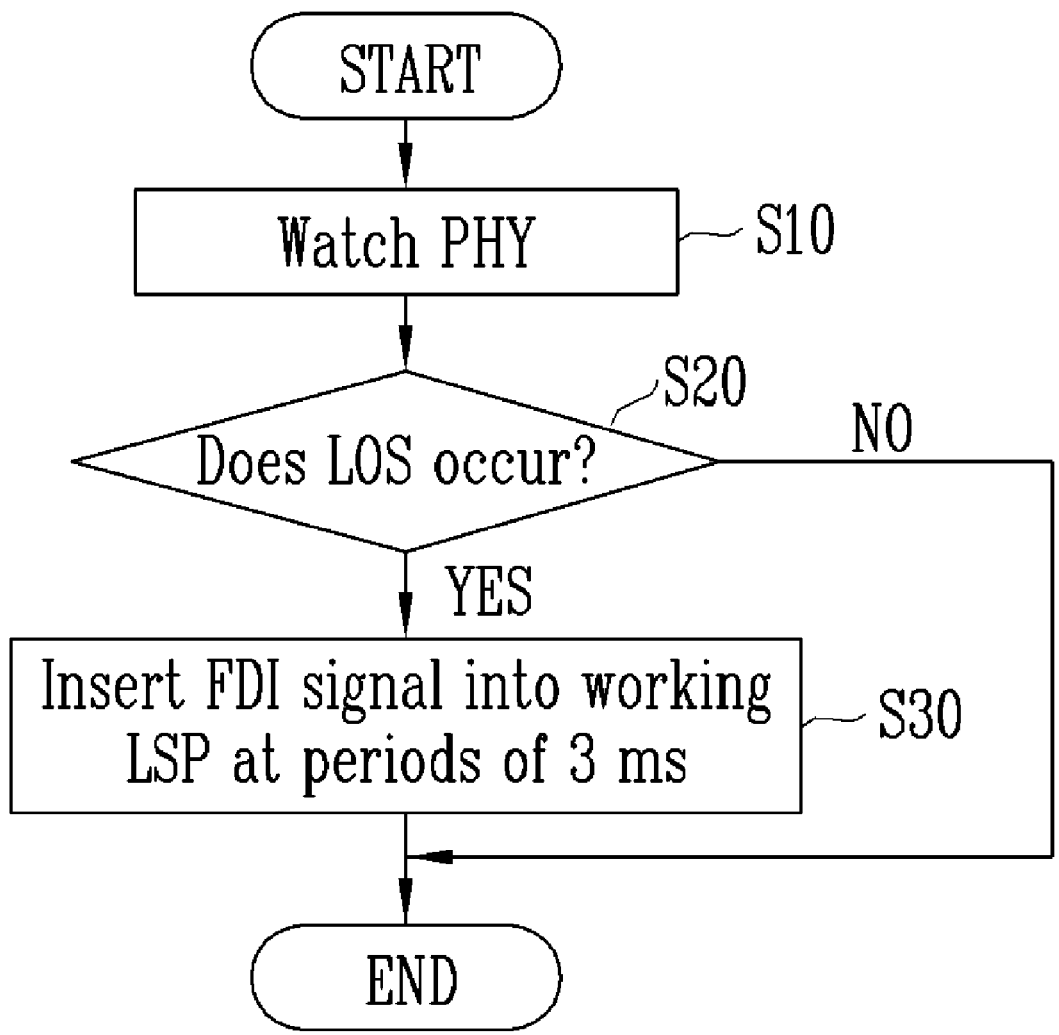
[Fig. 7]

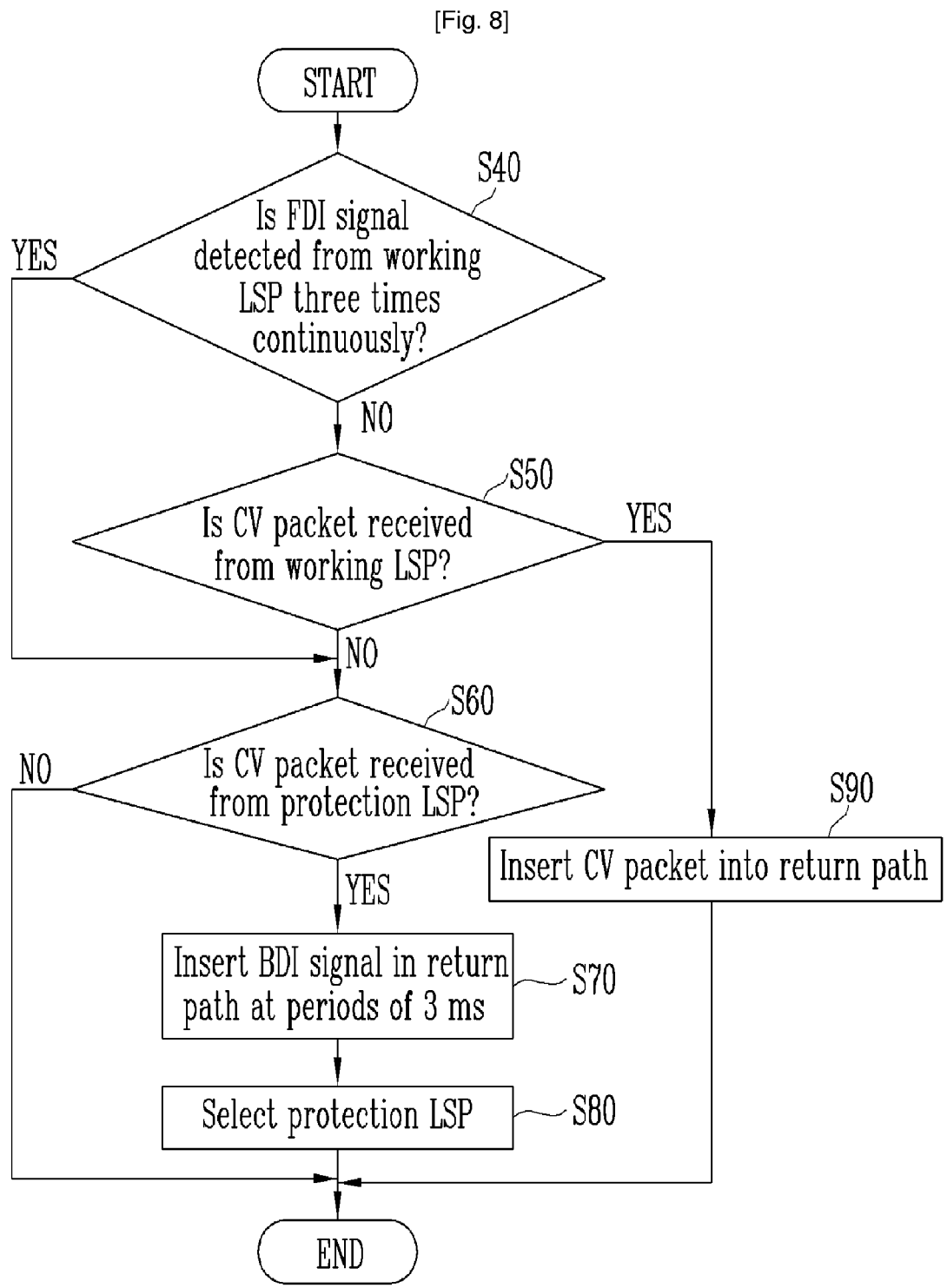
[Fig. 8]

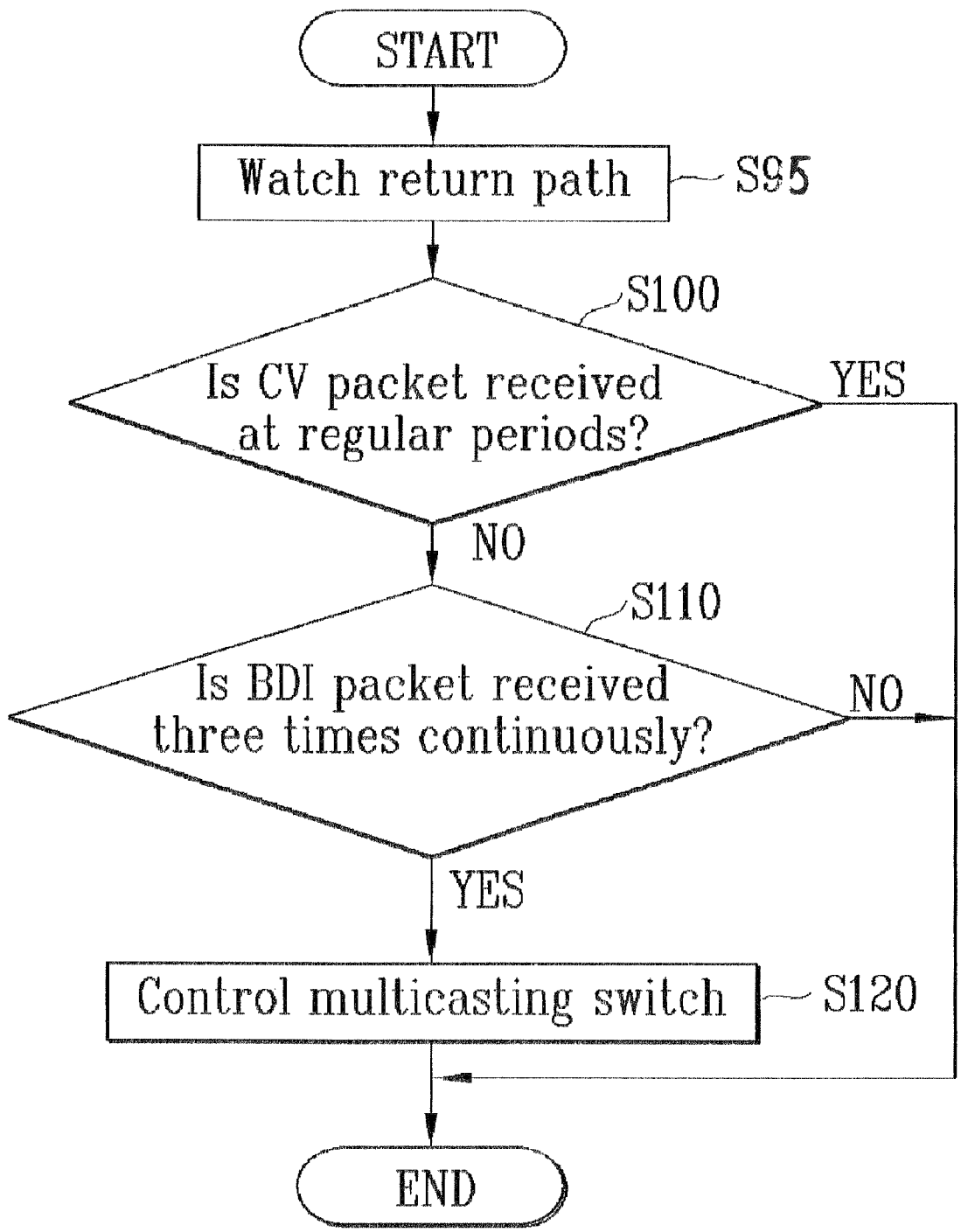
[Fig. 9]

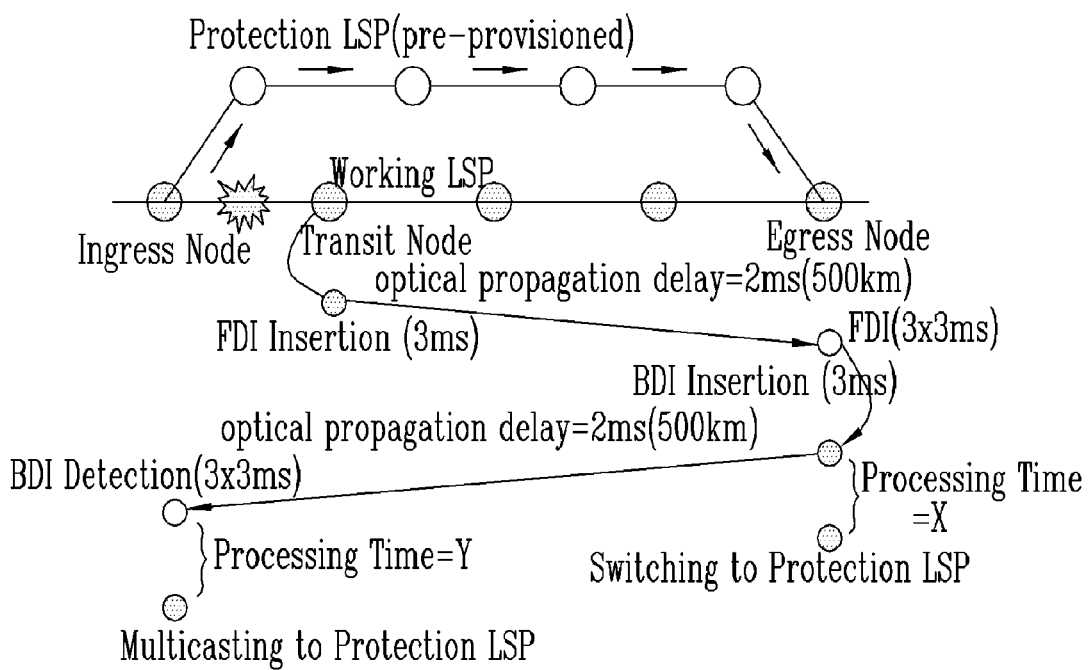
[Fig. 10]

APPARATUS AND METHOD FOR MULTI-PROTOCOL LABEL SWITCHING LABEL-SWITCHED PATH PROTECTION SWITCHING

RELATED APPLICATIONS

This application is a 35 U.S.C. 371 national stage filing of International Application No. PCT/KR2006/004747, filed 13 Nov. 2006, which claims priority to Korean Patent Application No. 10-2005-0120298 filed on 9 Dec. 2005 in Republic of Korea. The contents of the aforementioned applications are hereby incorporated by reference.

TECHNICAL FIELD

The present invention relates to an apparatus and method for multi-protocol label switching (MPLS) label-switched path (LSP) protection switching, and more particularly, to an MPLS LSP protection switching apparatus and method for an MPLS LSP in a 1:1 mode, and when a failure occurs on the LSP, performing protection switching on a path on which the failure occurs.

BACKGROUND ART

Protection switching technology has been mainly applied to synchronous digital hierarchy (SDH)/synchronous optical networking (SONET) that is a synchronous optical transmission apparatus. Further, in the SDH/SONET, there is ring protection switching technology having a self-healing function such as unidirectional path switched ring (UPSR) and bidirectional line switched ring (BLSR), as well as line protection switching technology that operates in a point-to-point mode such as a 1:1 mode and a 1:N mode.

In general, the protection switching technology applied to the SDH/SONET minimizes traffic loss by completing protection switching within 50 ms, thereby preventing the communication between client apparatuses from being affected. However, in the case of a multi-protocol label switching (MPLS) label-switched path (LSP), since there is no such technology capable of performing protection switching in a physical layer, it is hard to perform the protection switching within 50 ms.

Therefore, according to conventional MPLS technology, when a failure occurs on an LSP, availability of the LSP deteriorates, so that it is not possible to ensure signal quality of traffic transmitted through the LSP. The reason is as follows. When the failure occurs, the protection switching is not rapidly performed on the LSP on which the failure occurs. The LSP should be reset, or a new route should be calculated and set in a section other than the failure section by a failure restoration function, and thus a lot of time is spent and a loss of traffic is great.

In other words, in a conventional MPLS system, the LSP is reset through a detour route by the LSP resetting and the failure restoration function, and thus a lot of time is taken for the failure restoration. Therefore, the conventional MPLS system has problems in that the availability of an MPLS network deteriorates and a quality-guaranteed service cannot be provided.

DISCLOSURE OF INVENTION

Technical Problem

The present invention is directed to an apparatus and method for multi-protocol label switching (MPLS) label-switched path (LSP) protection switching, capable of performing protection switching on an MPLS LSP in real time within 50 ms.

The present invention is also directed to an apparatus and method for MPLS LSP protection switching in an MPLS system employing a working LSP and a protection LSP in a 1:1 mode, in which a dedicated LSP is prepared for the working LSP, thereby rapidly processing a forward defect indication (FDI)/backward defect indication (BDI) signal when a failure occurs on the working LSP.

Technical Solution

One aspect of the present invention provides a method for multi-protocol label switching (MPLS) label-switched path (LSP) protection switching, comprising the steps of: (a) setting a dedicated protection LSP and a return path for one working LSP, the return path transmitting a backward defect indication (BDI) signal indicating whether or not a failure occurs; (b) when the failure occurs, generating, at a transit node of the working LSP, a forward defect indication (FDI) signal having failure information and transmitting the FDI signal to an egress node; (c) detecting, at the egress node, the FDI signal, inserting the BDI signal, and switching the working LSP to the protection LSP; and (d) receiving, at an ingress node, the BDI signal and multicasting MPLS traffic to the working LSP and the protection LSP.

Preferably, the FDI signal may be generated at periods of 3 ms or less.

Preferably, step (b) may comprise the steps of: (b1) monitoring a failure of a physical layer on the working LSP; (b2) determining whether or not loss of signal (LOS) or another failure occurs in the physical layer; (b3) as a result of the determination, when the LOS or other failure occurring in the physical layer affects the working LSP, inserting the FDI signal; and (b4) as a result of the determination, when no failure occurs in the physical layer, performing no operation related to the FDI insertion.

Preferably, step (c) may comprise the steps of: (c1) continuously monitoring a FDI packet or a connectivity verification (CV) packet in order to check whether or not the failure occurs on the working LSP; (c2) performing first checking on whether or not an FDI packet is continuously detected from the working LSP as many times as defined; (c3) as a result of the first checking, when the FDI packet is continuously detected as many times as defined, determining that the failure occurs at the transit node and performing switching control; (c4) as a result of the first checking, when the FDI packet is not continuously detected as many times as defined, performing second checking on whether or not a CV packet is received within a predetermined time; (c5) as a result of the second checking, when the CV packet is not received from the working LSP within the predetermined time, determining that the failure occurs in front of the egress node and performing the switching control; (c6) as a result of the second checking, when the CV packet is not received from the protection LSP, determining that a failure occurs on the protection LSP and performing no operation related to switching; and (c7) as a result of the second checking, when the CV packet is received from the working LSP within the predetermined time, determining that the working LSP normally works, inserting the CV packet into the return path, and receiving an MPLS packet through the working LSP.

Preferably, step (c5) may comprise the steps of: checking whether or not the CV packet is received within the predetermined time in order to determine whether or not the failure occurs on the protection LSP before the switching to the protection LSP; as a result of the checking, when the CV packet is continuously received from the protection LSP, inserting the BDI signal into the return path; and selecting the protection LSP and preparing to receive the MPLS packet.

Preferably, step (d) may comprise the steps of: (d1) monitoring whether the CV packet or the BDI packet is received through the return path; (d2) as a result of the monitoring, when the CV packet is received at regular periods, canceling switching operation and controlling a connection state of the protection LSP to be recognized by the egress node; (d3) as a result of the monitoring, when the BDI packet is received, checking whether or not the BDI signal is continuously received as many times as defined; (d4) as a result of the checking, when the BDI signal is continuously received as many times as defined, controlling a multicasting switch to simultaneously transmit the MPLS packet to the working LSP and the protection LSP; and (d5) as a result of the checking, when the BDI signal is not continuously received as many times as defined, determining that no failure occurs on the working LSP and canceling the switching operation.

Preferably, step (d5) comprises the step of, when the BDI signal is no longer received and the CV signal is received at the ingress node, terminating the multicasting function to transmit the MPLS packet through the working LSP alone.

Another aspect of the present invention provides an apparatus for MPLS LSP protection switching performed at an ingress node in an MPLS network. The apparatus comprises: a backward defect indication (BDI) detector detecting a BDI packet from a return path in order to recognize whether or not a failure occurs on a downstream LSP;

a multicasting switch, when the BDI packet is detected, multicasting an input MPLS packet to a working LSP and a protection LSP; and a connectivity verification (CV) packet generator periodically generating a CV packet so that a connection state of the protection LSP can be monitored at an egress node.

Still another aspect of the present invention provides an apparatus for MPLS LSP protection switching performed at a transit node in an MPLS network. The apparatus comprises: a failure detector detecting a failure of a physical layer using an input MPLS signal; a forward defect indication (FDI) insertion switch, when the failure occurs, controlling whether or not an FDI signal is inserted into a working LSP on which the failure occurs; an FDI packet generator generating an FDI packet having failure information; a label generator generating a label of the working LSP on which the failure occurs; a packet switch fabric switching an MPLS packet output by control of the FDI insertion switch; a label swapper swapping a label of the MPLS packet output from the packet switch fabric; and a physical layer transmitting the label-swapped MPLS packet.

Preferably, the FDI packet generator may generate the FDI packet at periods of 3 ms or less.

Yet another aspect of the present invention provides an apparatus for MPLS LSP protection switching performed at an egress node in an MPLS network. The apparatus comprises: a forward defect indication (FDI) detector detecting an FDI signal from a working LSP on which a failure occurs; a switch fabric controller controlling one of the working LSP and a protection LSP to be selected using the detected FDI signal; a backward defect indication (BDI) packet generator generating a BDI signal and a location at which the failure occurs on the working LSP using the detected FDI signal; a BDI insertion switch inserting the generated BDI packet into a return path when the failure occurs; an LSP label generator processing a label of the return path; a connectivity verification (CV) packet generator periodically generating a CV packet and allowing a connection state of the return path to be monitored at an ingress node; a packet switch fabric switching the BDI packet and the CV packet output through the BDI insertion switch; and a physical layer transmitting the packets switched at the packet switch fabric.

Preferably, the CV packet generator may have a CV packet generation period set to a time 1 sec.

Yet another aspect of the present invention provides a system for MPLS LSP protection switching, comprising: an ingress node multicasting input MPLS traffic to a working LSP and a protection LSP using a fed-back backward defect indication (BDI) signal; a transit node relaying the MPLS traffic input from the ingress node, and when a failure occurs, generating a forward defect indication (FDI) signal; and an egress node extracting the MPLS traffic from an MPLS LSP input from the transit node, and when a forward defect indication (FDI) signal is detected, inserting and feeding back the BDI signal to the ingress node through a return path and performing switching to the protection LSP.

Advantageous Effects

The apparatus and method for multi-protocol label switching (MPLS) label-switched path (LSP) protection switching have the following effects. The apparatus and method make up the MPLS LSP of the working LSP and the protection LSP according to a 1:1 mode, and can perform protection switching within 50 ms, thus capable of preventing quality of service from deteriorating and improving availability of an MPLS network up to a level of synchronous digital hierarchy (SDH)/synchronous optical network (SONET).

In addition, the apparatus and method process a forward defect indication (FDI) signal and a backward defect indication (BDI) signal by hardware, and thus a maintenance signal and an interface applied to conventional SDH/SONET are simplified and a direct interface between the MPLS layer and the physical layer is possible. Therefore, additional software interface module is not necessary.

BRIEF DESCRIPTION OF THE DRAWINGS

FIG. 1 illustrates a double 1:1 multi-protocol label switching (MPLS) label-switched path (LSP) system in its normal state according to an exemplary embodiment of the present invention;

FIG. 2 is a block diagram of an ingress node at which an MPLS packet is multicast to a working LSP and a protection LSP according to an exemplary embodiment of the present invention;

FIG. 3 is a block diagram of a transit node at which a forward defect indication (FDI) signal is inserted when a failure occurs on an MPLS LSP according to an exemplary embodiment of the present invention;

FIG. 4 is a block diagram of an egress node at which FDI is inserted in a backward defect indication (BDI) packet according to an exemplary embodiment of the present invention;

FIG. 5 illustrates the 1:1 MPLS LSP system employing a redundant protection path in its abnormal state (in a failure state) according to an exemplary embodiment of the present invention;

FIG. 6 illustrates a structure of an MPLS-FDI/BDI operation, administration, and management (OAM) packet format for protection switching according to an exemplary embodiment of the present invention;

FIG. 7 is a flowchart showing a process of inserting an FDI packet at the transit node according to an exemplary embodiment of the present invention;

FIG. 8 is a flowchart showing a process of detecting an FDI packet and inserting a BDI packet at the egress node;

FIG. 9 is a flowchart showing a process of controlling a multicasting switch at an ingress node when a BDI packet is received; and FIG. 10 illustrates a processing time taken at each node for MPLS LSP protection switching within 50 ms according to an exemplary embodiment of the present invention.

MODE FOR THE INVENTION

Hereinafter, exemplary embodiments of the present invention will be described in detail. However, the present invention is not limited to the exemplary embodiments disclosed below, but can be implemented in various forms. Therefore, the present exemplary embodiments are provided for complete disclosure of the present invention and to fully convey the scope of the present invention to those of ordinary skill in the art.

FIG. 1 illustrates a 1:1 multi-protocol label switching (MPLS) label-switched path (LSP) system employing a redundant protection path in its normal condition according to the present invention.

As illustrated in FIG. 1, the system comprises an ingress node 101 multicasting MPLS traffic input through a fed-back backward defect indication (BDI) signal to a working LSP 110 and a protection LSP 111; a transit node 103 relaying the MPLS traffic input from the ingress node 101, and when a failure occurs, generating a forward defect indication (FDI) signal; and an egress node 102 extracting the MPLS traffic input from the transit node 103 from an MPLS LSP, and when the FDI signal is detected, inputting and feeding back a BDI signal to the ingress node 101 through a return path 113, and performing switching to the protection LSP 111.

As illustrated in FIG. 2, the ingress node 101 comprises the working LSP 110 and the protection LSP 111 for 1:1 switching, and a BDI detector 12, a multicasting switch 14, and a connectivity verification (CV) packet generator 16. The BDI detector 12 detects, from the return path 113, a BDI signal for indicating whether or not a failure occurs on a downstream LSP. When the BDI signal is detected, the multicasting switch 14 multicasts an input MPLS packet to the working LSP 110 and the protection LSP 111. The CV packet generator 16 generates a CV packet allowing a connection state of the protection LSP 111 to be monitored at the egress node 102.

Here, the CV packet generator 16 periodically generates the CV packet or a fast failure detection (FFD) packet, and preferably sets the generation period of the CV packet to a time 1 sec and that of FFD from 10 ms to 500 ms adjusted by 10 ms.

As illustrated in FIG. 3, the transit node 103 comprises a failure detector 21, an FDI insertion switch 22, an FDI packet generator 23, a label generator 24, a packet switch fabric 25, a label swapper 26, and a physical layer (PHY) 27. The failure detector 21 detects a physical layer failure using the input MPLS signal. When the failure is detected, the FDI insertion switch 22 controls whether or not an FDI signal is inserted through the working LSP on which the failure occurs. The FDI packet generator 23 generates an FDI packet having failure information in real time. The label generator 24 generates a label of the working LSP on which the failure occurs. The packet switch fabric 25 switches an MPLS packet output by the control of the FDI insertion switch 22. The label swapper 26 swaps a label of the MPLS packet output from the packet switch fabric 25. The PHY 27 transmits the label-swapped MPLS packet.

Preferably, the FDI packet generator 23 may generate an FDI packet at periods of 3 ms or less.

As illustrated in FIG. 4, the egress node 102 comprises an FDI detector 31, a switch fabric controller 32, a BDI packet generator 33, a BDI insertion switch 34, an LSP label generator 35, a CV packet generator 36, a packet switch fabric 37, and a physical layer (PHY) 38. The FDI detector 31 detects an FDI signal from the working LSP 110 on which a failure occurs. The switch fabric controller 32 controls the packet switch fabric 37 to select one of the working LSP 110 and the protection LSP 111 using the detected FDI signal. The BDI packet generator 33 generates a BDI signal including information on a location at which the failure occurs on the working LSP 110 using the FDI signal detected by the FDI detector 31. When the failure occurs, the BDI insertion switch 34 inserts the generated BDI packet into the return path 113. The LSP label generator 35 processes a label of the return path 113. The CV packet generator 36 periodically generates a CV packet and allows a connection state of the return path 113 to be monitored at the ingress node 101. The packet switch fabric 37 switches the BDI packet and the CV packet output through the BDI insertion switch 34. The PHY 38 transmits the packets switched by the packet switch fabric 37.

Here, the CV packet generator 36 periodically generates the CV or FFD packet, and preferably sets the generation period of the CV packet to a time 1 sec and that of the FFD from 10 ms to 500 ms adjusted by 10 ms.

An operation of the MPLS LSP protection switching apparatus according to the present invention will be described in detail with reference to the appended drawings.

MPLS is a kind of transmission technology that adds a "Shim" header to data traffic as in Internet protocol (IP), and transmits the data traffic. Here, the Shim header has a label indicating a destination to which the traffic is transmitted.

The label is generated and inserted at the ingress node 101, and extracted and removed at the egress node 102. And, the transit node 103 serves to swap and relay the label.

Therefore, when MPLS LSP is normal, MPLS traffic input into the ingress node 101 is transmitted to the egress node 102 through the working LSP 110 via the transit node 103. In addition, an MPLS-operation, administration, and maintenance (OAM) packet for monitoring whether or not a failure occurs on the protection LSP 111 and the return path 113 is periodically inserted.

Meanwhile, when the failure occurs on the working LSP 110, e.g., when traffic cannot be normally transmitted due to another failure 104, such as cable disconnection, between the ingress node 101 and the transit node 103 as illustrated in FIG. 5, the traffic is protected through the protection LSP 111.

When the failure occurs in the 1:1 MPLS LSP system operating as described above, the transit node 101, the egress node 102, and the ingress node 103 operate as described below in detail.

First Embodiment

FIG. 3 is a block diagram illustrating a first embodiment of inserting an FDI signal at a transit node when a failure occurs on an MPLS LSP, according to the present invention.

Referring to FIG. 3, when a failure occurs between the ingress node 101 and the transit node 103, the failure is detected, and the FDI signal is inserted by the transit node 103 in a hardware way.

More specifically, when no failure occurs on the MPLS LSP, the FDI insertion switch 22 selects a "normal" state, so that an MPLS packet is switched by the packet switching fabric 25. Then, the MPLS packet is subjected to label swapping by the label swapper 26 and transmitted to the next node through the PHY 27.

However, when the failure occurs on the MPLS LSP, the failure detector 21 controls the FDI insertion switch 22 to select a "failure" state. Here, the FDI packet generator 23 generates an FDI/BDI OAM packet at periods of 3 ms or less, as shown in FIG. 6. The LSP label generator 24 generates an MPLS header label of the LSP on which the failure occurs, as shown in FIG. 6.

Then, the MPLS header label generated by the LSP label generator 24 and an output signal of the FDI packet are added to each other to generate an MPLS-FDI OAM packet, as shown in FIG. 6.

Here, as illustrated in FIG. 5, the failure detector 21 detects the failure 104 such as cable disconnection according to a state of signal operation at the egress node 102, and controls the FDI insertion switch 22.

FIG. 7 is a flowchart showing a process of inserting an FDI packet at the transit node.

Referring to FIG. 7, a failure of a physical layer on an LSP is monitored (S10).

Subsequently, it is determined whether or not a loss of signal (LOS) or another failure occurs in the physical layer (S20).

As a result of the determination (S20), when the failure affects an MPLS LSP, an FDI signal is inserted into the working LSP 110 at periods of 3 ms (S30). However, when no failure occurs in the physical layer, operation related to the FDI signal insertion is not performed.

Second Embodiment

FIG. 4 is a block diagram showing an embodiment of inserting FDI in a BDI packet at an egress node, according to the present invention.

Referring to FIG. 4, the FDI detector 31 receives an MPLS packet that is transmitted from the transit node 103 as in the first embodiment, and detects an FDI packet. Here, when the FDI packet is detected by the FDI detector 31, it is recognized that a failure occurs at the transit node 103. Thereby, the BDI insertion switch 34 is controlled.

More specifically, in a normal state, the BDI insertion switch 34 selects an output signal of the CV packet generator 36 in order to monitor a connection state of the return path 113. Here, the CV packet generator 36 periodically generates the CV or FFD packet, and sets the generation period of the CV to a time 1 sec and that of the FFD from 10 ms to 500 ms adjusted by 10 ms.

The BDI packet generator 33 generates a packet as shown in FIG. 6. Here, a defect location (DL) indicating a location at which the failure occurs in the packet makes reference to content carried in the FDI packet.

The LSP label generator 35 generates a label of the return path 113. The label is added to an output of the BDI packet generator 33, so that a BDI OAM packet is formed. Here, in order to perform rapid switching when the BDI insertion switch 34 is switched to a failure state by FDI detector 31, the LSP label generator 35 generates the BDI OAM packet at periods of 3 ms.

The generated BDI OAM packet is switched to the return path 113 by the packet switch fabric 37, and transmitted to the ingress node 101 through the physical layer 38.

Meanwhile, the FDI detector 31 makes the packet switch fabric 37 select the protection LSP 111 using the switch fabric controller 32, thereby preparing to receive an MPLS packet.

FIG. 8 is a flowchart of a protection switching function performed at the egress node.

Referring to FIG. 8, an FDI packet or a CV packet is continuously monitored to check whether or not a failure occurs on the working LSP 110. Here, when an FDI signal is detected, it is determined that the failure occurs at the transit node 103. Further, when the CV packet is not received, it is determined that a failure occurs in front of the egress node 102.

As a result of the monitoring, it is checked whether or not an FDI signal is detected from the working LSP 110 three times continuously (S40). Here, the detection of the third consecutive FDI signal is directed to positively determine the failure.

As a result of the checking (S40), when the FDI signals are detected, it is determined that the failure occurs at the transit node 103, and thus the operation related to switching control is performed (S60, S70, and S80).

However, when the FDI signals are not detected, it is checked whether or not the CV packet is received from the working LSP 110 within a predetermined time (S50). This is because the CV packet should be received from a normally-working LSP at regular periods.

As a result of the checking (S50), when the CV packet is not received, the failure is considered to occur in front of the egress node 102, and thus the operation related to the switching is performed (S60, S70, and S80).

The operation related to the switching (S60, S70, and S80) is described below.

First, it is checked whether or not the CV packet is received within a predetermined time in order to determine whether or not the failure occurs on the protection LSP 111 before switching to the protection LSP 111 (S60).

As a result of the checking (S60), when the CV packet is continuously received from the LSP 111, it is determined that the protection LSP is normal, and a BDI signal is inserted into the return path 113 at periods of 3 ms (S70). Here, the BDI signal is inserted in order to control the ingress node 101 to simultaneously transmit MPLS traffic to the working LSP 110 and the protection LSP 111 using the BDI signal.

Subsequently, the protection LSP 111 is selected, and it is prepared to receive an MPLS packet (S80).

In contrast, when the CV packet is not received from the protection LSP 111, it is determined that the failure occurs on the protection LSP 111 and the operation related to the switching is not performed.

In addition, when the CV packet is received within a predetermined time, it is determined that the working LSP 110 is normal and the CV packet is inserted into the return path 113(S90).

Meanwhile, according to operation related to switching restoration, when the CV signal is received within a predetermined time, and when the FDI signal is not received at the egress node 102, it is determined that the working LSP 110 is restored to its normal state, and the CV signal instead of the BDI signal is carried on the return path 113. Then, MPLS traffic is received through the working LSP 110.

Third Embodiment

FIG. 2 illustrates an embodiment of multicasting an MPLS packet to a working LSP and a protection LSP at an ingress node according to the present invention.

Referring to FIG. 2, the BDI detector 12 receives a BDI OAM packet transmitted from the egress node 102 as in Second Embodiment, and detects a BDI packet. Here, when the BDI packet is detected by the BDI detector 12, it is determined that the failure occurs at the egress node 102.

Thereby, the multicasting switch 14 is controlled to multicast an MPLS packet to the working LSP 110 and the protection LSP 111, thus performing a protection switching function related to a transmission unit.

By using the multicasting switch 14 in this way, the same effect as in a 1:1 switching method of synchronous digital hierarchy (SDH)/synchronous optical network (SONET) that bridges traffic to be protected to a working link and a protection link is obtained.

FIG. 9 is a flowchart illustrating a process of controlling a multicasting switch when a BDI packet is received at an ingress node according to the present invention, illustrating a method of performing operation related to switching at the ingress node 101.

Referring to FIG. 9, it is monitored whether a CV packet or a BDI packet is received through the return path 113 (S95).

Subsequently, it is determined whether or not the CV packet is received at regular periods (S100).

As a result of the determination (S100), when the CV packet is received at regular periods, the working LSP 110 is normally in operation. Hence, the CV packet generator 16 is selected to allow the egress node 102 to monitor a connection state of the protection LSP 111 without performing operation related to switching.

However, when the BDI packet is received instead of the CV packet, it is checked whether or not a BDI signal is received three times continuously (S110).

As a result of the checking (S110), when the BDI signal is received three times continuously, the multicast switch 14 is controlled to simultaneously transmit MPLS traffic to both the working LSP 110 and the protection LSP 111 (S120).

In contrast, when the BDI signal is not received three times continuously, it is determined that the failure does not occur on the working LSP 110, and thereby the operation related to switching is not performed.

Here, according to operation related to switching restoration, when the BDI signal is no longer received, and the CV packet is received at the ingress node 101, the multicasting function is terminated and MPLS traffic is carried on the working LSP 110 alone.

FIG. 10 illustrates a processing time taken at each node for switching within 50 ms according to the present invention, and more particularly illustrates an embodiment in which the processing time is calculated in consideration of insertion, extraction, and physical transmission delay of FDI/BDI in order to show that switching is possible within 50 ms.

Referring to FIG. 10, when an FDI signal is inserted at periods of 3 ms at the transit node 103, it is 9 ms that it takes the third consecutive FDI signal to be received at the egress node 102. In addition, when a BDI signal is also inserted at periods of 3 ms at the egress node 102, it is 9 ms that it takes the BDI signal to be detected at the ingress node 101.

Meanwhile, an optical propagation delay is about 0.4 ms per 100 km. Thus, in the case of 500 km, the optical propagation delay is about 2 ms.

Therefore, a slack time for switching to the protection LSP 111 at the ingress node 101 and the egress node 102 is 36 ms, and thus the ingress node 101 and the egress node 102 each should perform operation related to switching within 28 ms in order to complete the switching within 50 ms.

To this end, in the present invention, the MPLS LSP is made up of the working LSP 110 and the dedicated protection LSP 111 in a 1:1 mode, so that it can perform the protection switching within 50 ms.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A method for multi-protocol label switching (MPLS) label-switched path (LSP) protection switching, comprising the steps of:
   (a) setting a dedicated protection LSP and a return path for one working LSP, the return path transmitting a backward defect indication (BDI) packet indicating whether or not a failure occurs;
   (b) when the failure occurs, generating, at a transit node of the working LSP, a forward defect indication (FDI) packet having failure information and transmitting the FDI packet to an egress node;
   (c) when the FDI packet is detected at the egress node, inserting the BDI packet into the return path to an ingress node and switching the working LSP to the protection LSP; and
   (d) when the BDI packet is detected at the ingress node, multicasting MPLS traffic to the working LSP and the protection LSP,
   wherein when a first CV (connection verification) packet is detected at the egress node, determining that the working LSP normally works, inserting a second CV packet into the return path and receiving an MPLS packet through the working LSP.

2. The method of claim 1, wherein the FDI packet is generated at periods of 3 ms or less.

3. The method of claim 1, wherein step (b) comprises the steps of:
   (b1) monitoring a failure of a physical layer on the working LSP;
   (b2) determining whether or not loss of signal (LOS) or another failure occurs in the physical layer;
   (b3) as a result of the determination, when the LOS or other failure occurring in the physical layer affects the working LSP, inserting the FDI packet; and
   (b4) as a result of the determination, when no failure occurs in the physical layer, performing no operation related to the FDI insertion.

4. The method of claim 1, wherein step (c) comprises the steps of:
   (c1) continuously monitoring a FDI packet or a connectivity verification (CV) packet in order to check whether or not the failure occurs on the working LSP;
   (c2) performing first checking on whether or not an FDI packet is continuously detected from the working LSP as many times as defined;
   (c3) as a result of the first checking, when the FDI packet is continuously detected as many times as defined, determining that the failure occurs at the transit node and performing switching control;
   (c4) as a result of the first checking, when the FDI packet is not continuously detected as many times as defined, performing second checking on whether or not a CV packet is received within a predetermined time;
   (c5) as a result of the second checking, when the CV packet is not received from the working LSP within the predetermined time, determining that the failure occurs in front of the egress node and performing the switching control;
   (c6) as a result of the second checking, when the CV packet is not received from the protection LSP, determining that a failure occurs on the protection LSP and performing no operation related to switching; and (c7) as a result of the second checking, when the CV packet is received from the working LSP within the predetermined time, determining that the working LSP normally works, inserting the CV packet into the return path, and receiving an MPLS packet through the working LSP.

5. The method of claim 4, wherein step (c5) comprises the steps of:
checking whether or not the CV packet is received within the predetermined time in order to determine whether or not the failure occurs on the protection LSP before the switching to the protection LSP;
as a result of the checking, when the CV packet is continuously received from the protection LSP, inserting the BDI packet into the return path; and
selecting the protection LSP and preparing to receive the MPLS packet.

6. The method of claim 1, wherein step (d) comprises the steps of:
(d1) monitoring whether a connectivity verification (CV) packet or the BDI packet is received through the return path;
(d2) as a result of the monitoring, when the CV packet or a fast failure detection (FFD) packet is received at regular periods, canceling switching operation and controlling a connection state of the protection LSP to be recognized by the egress node;
(d3) as a result of the monitoring, when the BDI packet is received, checking whether or not the BDI packet is continuously received as many times as defined;
(d4) as a result of the checking, when the BDI packet is continuously received as many times as defined, controlling a multicasting switch to simultaneously transmit the MPLS packet to the working LSP and the protection LSP; and
(d5) as a result of the checking, when the BDI packet is not continuously received as many times as defined, determining that no failure occurs on the working LSP and canceling the switching operation.

7. The method of claim 6, wherein step (d5) comprises the step of, when the BDI packet is no longer received and the CV packet is received at the ingress node, terminating the multicasting function to transmit the MPLS packet through the working LSP alone.

8. An apparatus for multi-protocol label switching (MPLS) label-switched path (LSP) protection switching performed at an ingress node in an MPLS network, comprising:
a backward defect indication (BDI) detector detecting a BDI packet from a return path in order to recognize whether or not a failure occurs on a downstream LSP;
a multicasting switch, when the BDI packet is detected, multicasting an input MPLS packet to a working LSP and a protection LSP; and
a connectivity verification (CV) packet generator periodically generating a first CV packet,
wherein when the BDI is not detected and a second CV packet is received from a return path, the first CV packet is transmitted through the protection LSP so that a connection state of the protection LSP can be monitored at an egress node.

9. An apparatus for multi-protocol label switching (MPLS) label-switched path (LSP) protection switching performed at an egress node in an MPLS network, comprising:
a forward defect indication (FDI) detector detecting an FDI packet from a working LSP on which a failure occurs;
a switch fabric controller controlling one of the working LSP and a protection LSP to be selected using the detected FDI packet;
a backward defect indication (BDI) packet generator generating a BDI packet and a location at which the failure occurs on the working LSP using the detected FDI packet;
a BDI insertion switch inserting the generated BDI packet into a return path when the failure occurs;
an LSP label generator processing a label of the return path;
a connectivity verification (CV) packet generator periodically generating a CV packet and allowing a connection state of the return path to be monitored at an ingress node;
a packet switch fabric switching the BDI packet and the CV packet output through the BDI insertion switch; and
a physical layer transmitting the packets switched at the packet switch fabric.

* * * * *